United States Patent [19]

Yoshida

[11] Patent Number: 4,459,619
[45] Date of Patent: Jul. 10, 1984

[54] IMAGE READING APPARATUS

[75] Inventor: Tadashi Yoshida, Tokyo, Japan

[73] Assignee: Canon Kabushiki Kaisha, Tokyo, Japan

[21] Appl. No.: 339,281

[22] Filed: Jan. 13, 1982

[30] Foreign Application Priority Data

Jan. 22, 1981 [JP] Japan .................................. 56-8216

[51] Int. Cl.³ .............................................. H04N 1/38
[52] U.S. Cl. .................................. 358/293; 358/213; 358/294
[58] Field of Search ................ 358/293, 294, 213, 285

[56] References Cited

U.S. PATENT DOCUMENTS 4,287,536  9/1981  Wiggins ............................. 358/293
4,358,794  11/1982  Kurakami ........................... 358/294

Primary Examiner—Howard W. Britton
Attorney, Agent, or Firm—Fitzpatrick, Cella, Harper & Scinto

[57] ABSTRACT

An image reading apparatus utilizing plural solid-state imaging devices, in which the boundaries of the mutually overlapping image reading areas of said imaging devices are detected to remove such overlapping with a simple processing.

12 Claims, 7 Drawing Figures

IMAGE READING APPARATUS

BACKGROUND OF THE INVENTION

1. Field of the Invention

The present invention relates to an image reading apparatus utilizing plural solid-state imaging devices.

2. Description of the Prior Art

In the image scanning with a solid-state imaging device there has been proposed the use of plural imaging devices in order to improve the resolving power of the image or to improve the transmission speed of the image signals.

An example of such image reading method is shown in FIG. 1, employing solid-state linear imaging devices A, B in combination with lenses 3, 4 for scanning a line in two blocks. The optical systems composed of said lenses project the image to be scanned onto photosensitive portions of said solid-state imaging devices. In such method, the optical systems should be so arranged that the scanning line becomes continuous at the boundary of said blocks.

In practice, however, it is difficult to exactly adjust the positions of two imaging devices according to the geometrical calculation of optical paths, and even a slight displacement of the imaging devices after the adjustment will result in an uncontinuous scanning line.

In order to avoid this drawback there has been proposed a method of so arranging plural solid-state imaging devices as that they read the image in a partially overlapping manner and eliminating the thus overlapping portion from the signals to compensate the positional aberrations of the imaging devices. FIG. 2 illustrates an example of such method, in which shown are areas A, B to be read respectively by the solid-state imaging devices; a test pattern 11 positioned outside the scanning area of the original in order to be read by said solid-state imaging devices A, B prior to the image scanning; and a reference marker 12 provided in said test pattern 11 and having a size of N pixels larger than the area overlappingly read by said solid-state imaging devices A and B. Prior to the image scanning the solid-state imaging devices A, B scan said test pattern 11 in a direction C to determine the number of bits NA until the reference marker 12 is read by the imaging device A and the number of bits NB until the end of the reference marker read by the imaging device B, and N−NB is calculated from said number NB. In the succeeding image scanning, the solid-state imaging device A performs the scanning from the 0-th bit to the (NA+N−NB)th bit while the imaging device B performs the scanning from the 0-th bit, thus eliminating the overlapping image information. However such method is still defective in requiring calculating function and involving complicated signal processing.

SUMMARY OF THE INVENTION

The object of the present invention is to provide an image reading apparatus not associated with the aforementioned drawbacks inherent to the use of plural solid-stage imaging devices.

Another object of the present invention is to provide an image reading apparatus capable of compensating positional aberrations without complicated processing.

Still another object of the present invention is to provide an image reading apparatus capable of easily compensating the positional aberration through the use of digitized image signals.

The foregoing and still other objects of the present invention will be made fully apparent from the following description of the preferred embodiments.

DETAILED DESCRIPTION OF THE PREFERRED EMBODIMENTS

Figure 1:
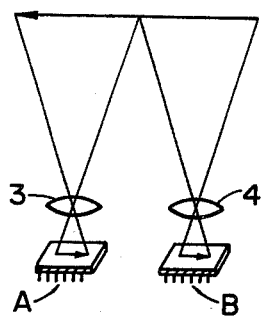
FIG. 1 is a schematic view showing the arrangement of solid-state imaging devices.
Figure 2:
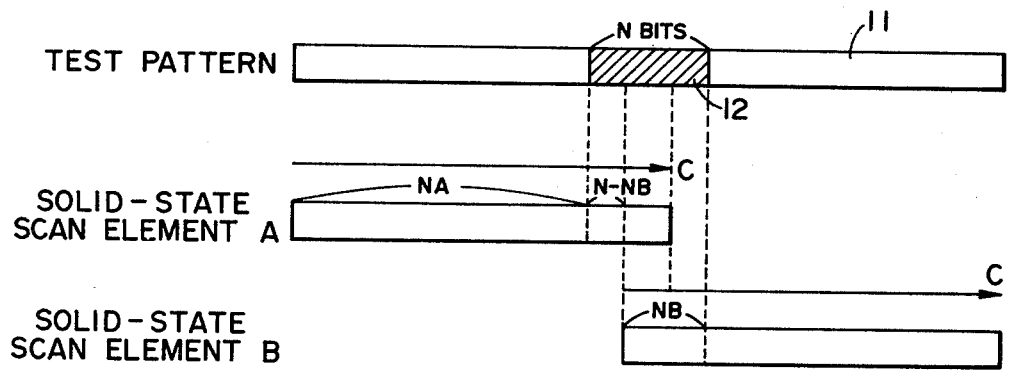
FIG. 2 is a schematic view showing a conventional method for compensating the positional aberration of the imaging devices.
Figure 3A:
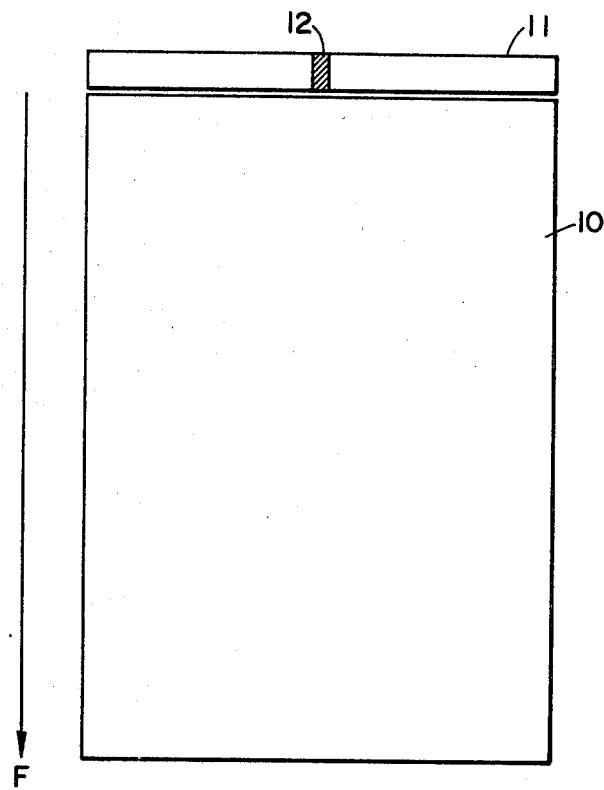
FIGS. 3A and 3B are schematic views showing the method of compensating the positional aberration of the imaging devices according to the present invention.
Figure 3B:
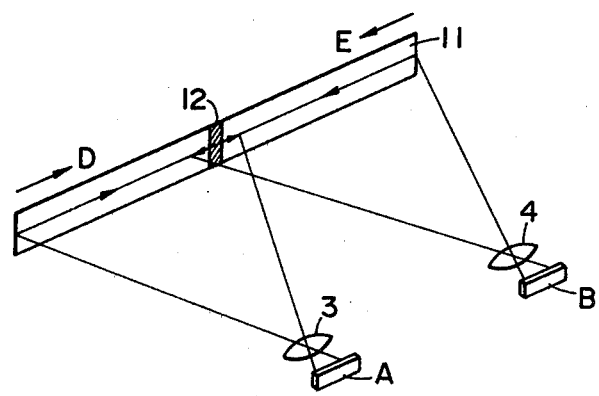

Now reference is made to FIGS. 3A and 3B showing the principle of the present invention in schematic views. In FIG. 3A, 10 indicates a plate for supporting an original to be read. The image of the original placed on said plate 10 is read by the principal scanning function of the solid-state imaging devices in the lateral direction in the illustration, combined by an auxiliary scanning in a direction F. Outside the image scanning area, i.e. outside said original support plate 10, there is provided a white test pattern in a similar manner as in the conventional method explained in relation to FIG. 2. At the approximate center of said test pattern 11 there is provided a black reference marker 12 corresponding to a number of pixels smaller than the number of pixels overlappingly read by the imaging devices A and B, as shown in FIG. 3B. Prior to the imaging reading, the solid-state imaging devices A and B scan said test pattern 11 respectively in directions D and E, i.e. toward the reference marker 12 to determine the number of pixels to said reference marker 12, and said number is utilized for eliminating the overlapping image, thus compensating the positional aberration of the imaging devices.

Figure 4:
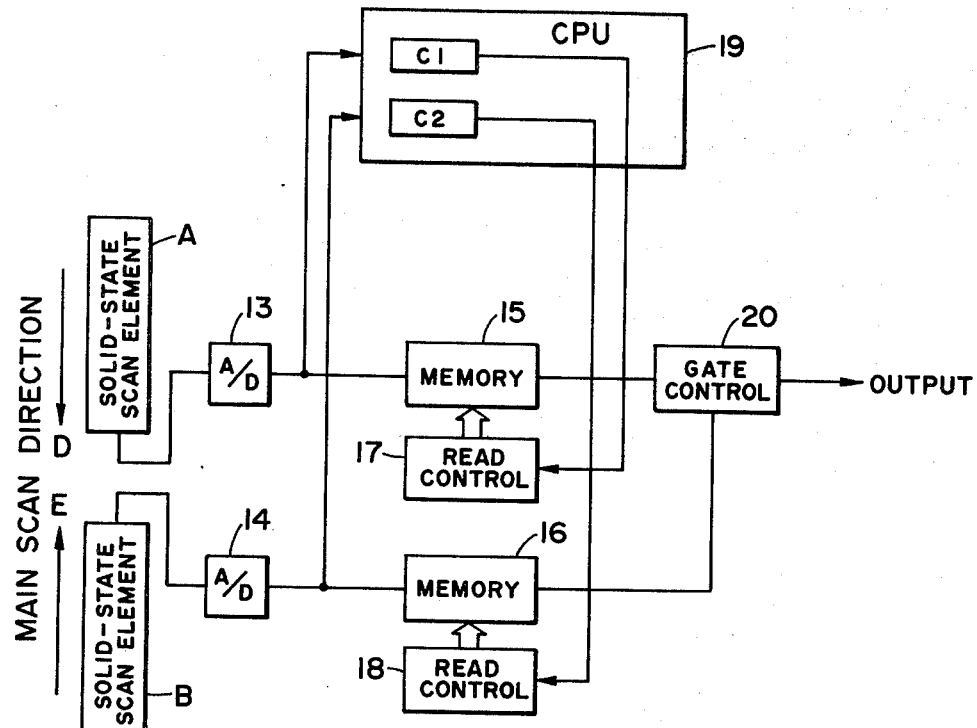
FIG. 4 is a block diagram of the circuit embodying the present invention.

Now referring to FIG. 4 showing the block diagram of the circuit embodying the present invention, in which is shown solid-state imaging devices A, B; analog-to-digital converters 13, 14; memories for storing image signals obtained in at least one scanning of the solid-state imaging devices A, B; readout control units 17, 18 for reading the signals from said memories 15, 16; a control CPU 19 for counting and memorizing the numbers of bits; and a gate control unit 20.

Figure 5:
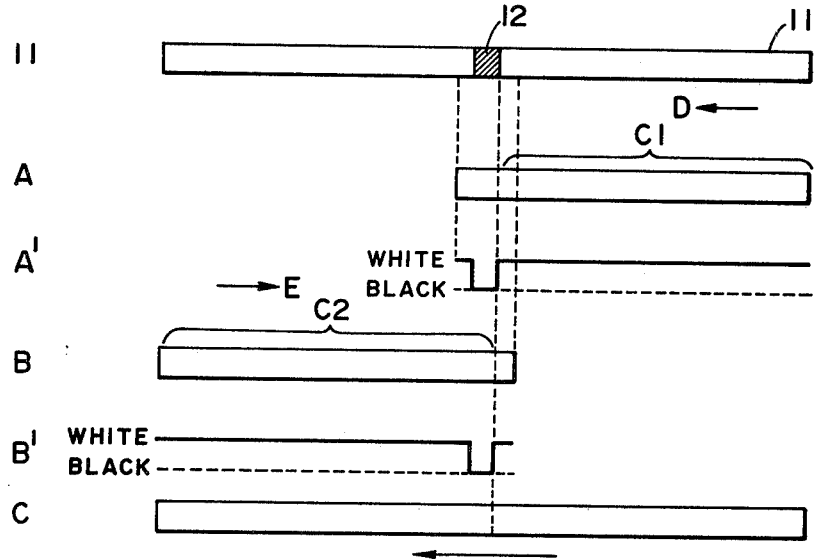
FIG. 5 is a chart showing signals read from the image.

Also FIG. 5 shows various signals obtained from the image according to the present invention, in which 11 is a test pattern having an above-mentioned reference marker 12 in the center, A and B are areas respectively read by said solid-state imaging devices, and A' and B' are signals obtained from said solid-state imaging devices A, B involving black and white levels. Prior to the image scanning, the imaging devices A, B each scan the test pattern in directions D and E, respectively toward the reference marker 12 to provide image reading signals A' and B' as shown in FIG. 5, and the number of bits C1 to the end of the black-level signal from the imaging device A and the number of bits C2 to the start of the black-level signal from the imaging device B are counted and memorized in the CPU 19. Said numbers can also be obtained by counting the transfer clock pulses for the imaging devices instead of direct counting of the number of bits. Said numbers C1, C2 are set in the readout control units 17, 18. The original is scanned subsequent to the above-mentioned scanning of the test pattern, and the image signals supplied from the imaging devices A, B and stored in the memories 15, 16 are read under the control by the readout control units 17, 18, in an order at first from 0-th to C1-th bit of the memory 15 and then from C2-th to 0-th bit of the memory 16 to provide continuous image signals as shown in FIG. 5C. The signal readout from the memory 15 or 16 is controlled by the switching in the gate control unit 20.

As explained in the foregoing, the present invention allows to compensate the positional aberration in the plural solid-state imaging devices without complicated processing such as calculations.

Although the foregoing embodiment employs a white test pattern 11 in combination with a black reference pattern 12, the present invention is not limited to such combination and can employ any combination of colors providing a discontinuity in the signal level at the edge of the reference marker 12.

Figure 6:
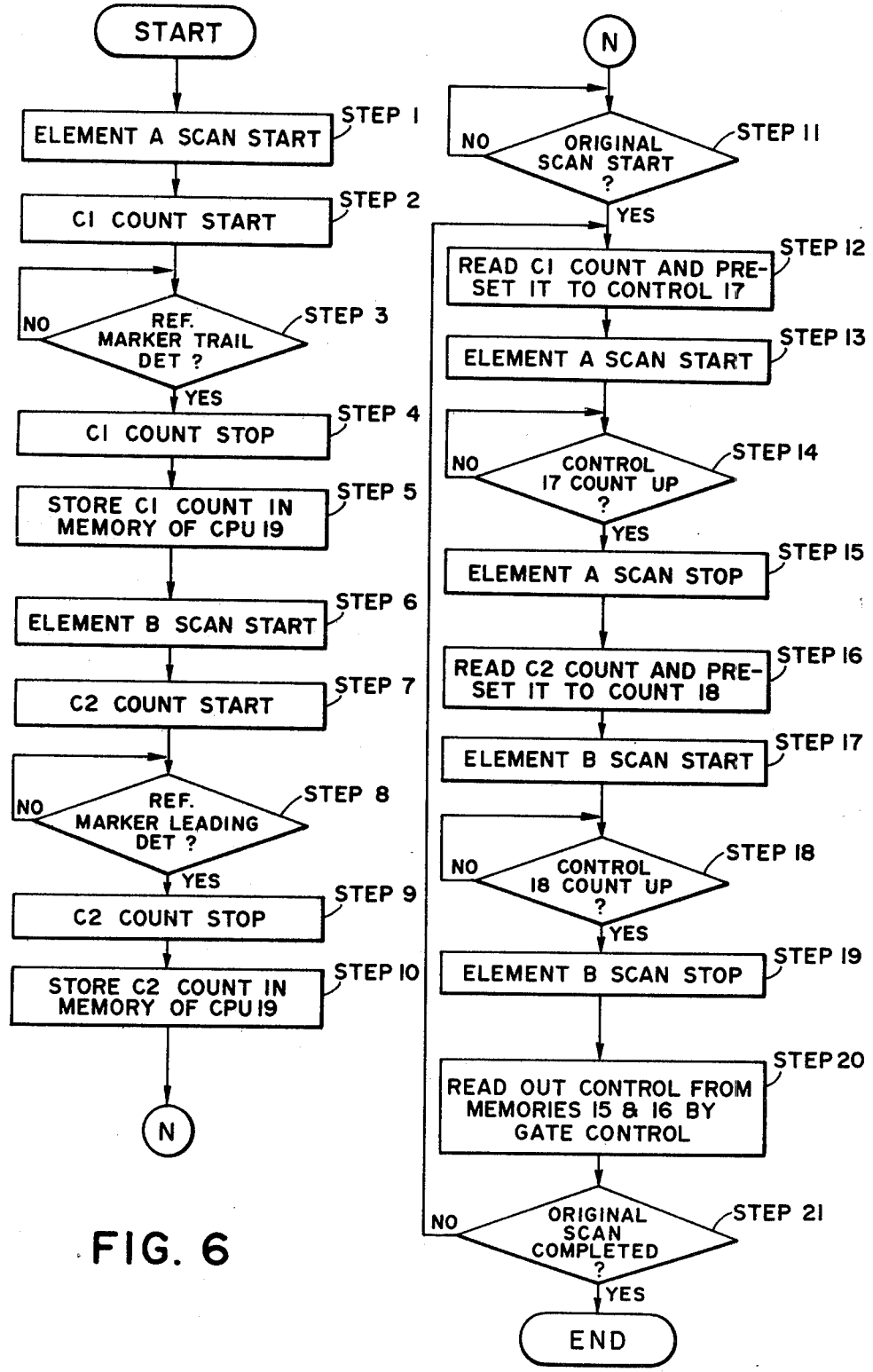
FIG. 6 is a flow chart showing the sequence control procedure of the embodiment shown in FIG. 4.

FIG. 6 shows a control flow chart of the function of the CPU 19, which will be further explained in the following.

The Step 1 initiates the scanning function of the solid-state imaging device A, from a position for detecting the reference marker. Simultaneously with said scanning the CPU 19 counts the number of pixels to the end of the reference marker shown in FIG. 5 to determine the number C1. Upon detection of the end of the black-level signal from the reference marker in the Step 3, the counter is stopped in the Step 4 and the count C1 is stored in a random access memory in the CPU 19 in the Step 5. The Steps 6 to 10 serve to detect the count C2 in the imaging device B and store said count in the memory in CPU 19 in the same manner as explained above. Subsequently the Step 11 initiates the scanning of the original, and the Step 12 sets the count C1 in the readout control unit 17. Subsequently the Step 13 initiates the scanning function of the imaging device A, the Step 14 stores the image signals in the memory 15 until the readout control unit 17 finishes the counting, and the Step 15 terminates the scanning function of the imaging device A. The Steps 16 to 19 similarly execute the storage of image signals from the imaging device B into the memory 16. The succeeding Step 20 controls the gate control unit 20 to release the serial image signals obtained from said imaging devices A, B and stored in said memories 15, 16 in an order at first from 0-th to C1-th bit of the memory 15 and then from C2-th to 0-th bit of the memory 16. The Steps 12 to 20 are repeated for the succeeding line if the Step 21 identifies that the scanning of the original is not yet completed.

I claim:

1. An image reading apparatus, comprising:
    plural solid-state imaging devices having different scanning directions for reading an original image;
    detecting means for detecting boundaries of mutually overlapping image reading areas of said plural imaging devices in accordance with signals derived from said plural solid-state imaging devices prior to the reading of the original image; and
    control means for controlling image signals from said imaging devices in reading the original image in accordance with the detection result of said detecting means so as to eliminate overlapping image reading areas in the reading by said imaging devices in response to the signals from said detecting means.

2. An image reading apparatus according to claim 1, wherein said plural solid-state imaging devices are arranged along a principal scanning direction.

3. An image reading apparatus according to claim 1, wherein said detecting means is adapted to detect an original scanning area by means of reading with said imaging devices a reference marker positioned outside said original scanning area.

4. An image reading apparatus according to claim 3, wherein said detecting means is adapted to detect said area by reading with said plural solid-state imaging devices an edge of said reference marker.

5. An image reading apparatus according to claim 4, further comprising means for counting the number of pixels obtained when said imaging devices read an edge of said reference marked.

6. An image reading apparatus according to claim 1, wherein said apparatus further comprises memory means for storing the image signals from said plural solid-state imaging device, and said control means controls said memory means.

7. An image reading apparatus according to claim 6, wherein said memory means is provided in plural memory units corresponding respectively to said plural imaging devices.

8. An image reading apparatus according to claim 7, further comprising selecting means for selectively outputting the image signals read out from said plural memory units.

9. An image reading apparatus, comprising:
    plural solid-state imaging devices for reading an original image, said plural imaging devices being arranged to read overlapping portions of the original image;
    plural memory units, each memory unit being associated with a separate one of said plural imaging devices for storing image signals from each associated one of said plural imaging devices;
    a reference marker positioned in an area outside an original scanning area and within an area which is overlappingly read by said plural imaging devices;
    detecting means for detecting the area overlappingly read by said plural imaging devices in accordance with a signal obtained when said reference marker is read by said plural imaging devices; and
    means for controlling read out of the image signals from said plural memory units so as to eliminate image signals of the area detected by said detecting means from image signals obtained from reading the original image by said plural imaging devices.

10. An image reading apparatus according to claim 9, wherein said plural solid-state imaging devices are arranged along a principal scanning direction.

11. An image reading apparatus according to claim 9, wherein said reference marker is read by said plural imaging devices prior to the reading of the original image.

12. An image reading apparatus according to claim 9, wherein said eliminating means eliminates the image signals of the area detected by said detecting means from the image signals derived from said plural imaging devices for every line.

* * * * *